United States Patent
Nakasha et al.

(10) Patent No.: US 8,054,908 B2
(45) Date of Patent: Nov. 8, 2011

(54) TRANSMITTER CIRCUIT AND RADIO TRANSMISSION APPARATUS FOR TRANSMITTING DATA VIA RADIO BY USING IMPULSES

(75) Inventors: Yasuhiro Nakasha, Kawasaki (JP); Yoichi Kawano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 784 days.

(21) Appl. No.: 11/987,703

(22) Filed: Dec. 4, 2007

(65) Prior Publication Data

US 2008/0198939 A1 Aug. 21, 2008

(30) Foreign Application Priority Data

Feb. 19, 2007 (JP) ................................. 2007-038390

(51) Int. Cl.
*H04L 27/00* (2006.01)
(52) U.S. Cl. .......... 375/295; 327/291; 332/106; 341/20; 341/173; 370/206
(58) Field of Classification Search .................... 375/295
See application file for complete search history.

(56) References Cited

U.S. PATENT DOCUMENTS

| | | | | |
|---|---|---|---|---|
| 4,797,585 A * | 1/1989 | Segawa et al. | ................ | 327/172 |
| 5,272,729 A * | 12/1993 | Bechade et al. | ................ | 375/371 |
| 5,390,153 A * | 2/1995 | Scherbatskoy | ................ | 367/83 |
| 5,481,230 A * | 1/1996 | Chang et al. | ................ | 332/112 |
| 5,963,071 A * | 10/1999 | Dowlatabadi | ................ | 327/175 |
| 6,025,744 A * | 2/2000 | Bertolet et al. | ................ | 327/276 |
| 6,229,359 B1 * | 5/2001 | Chesavage | ................ | 327/116 |
| 6,249,392 B1 * | 6/2001 | Sacks et al. | ................ | 360/31 |
| 6,298,726 B1 * | 10/2001 | Adachi et al. | ................ | 73/632 |
| 6,396,604 B1 * | 5/2002 | Smith et al. | ................ | 398/99 |
| 6,690,741 B1 * | 2/2004 | Larrick et al. | ................ | 375/295 |
| 2002/0158652 A1 * | 10/2002 | Okayasu | ................ | 324/765 |
| 2005/0141602 A1 * | 6/2005 | Hyun et al. | ................ | 375/219 |
| 2006/0232308 A9 * | 10/2006 | Kumata | ................ | 327/158 |
| 2006/0234761 A1 * | 10/2006 | Nagasaka | ................ | 455/552.1 |
| 2007/0297487 A1 * | 12/2007 | Mimura et al. | ................ | 375/130 |
| 2008/0069183 A1 * | 3/2008 | Terada | ................ | 375/137 |
| 2009/0154527 A1 * | 6/2009 | Yoichi | ................ | 375/130 |
| 2010/0060294 A1 * | 3/2010 | Suda | ................ | 324/555 |
| 2010/0225369 A1 * | 9/2010 | Badaroglu | ................ | 327/158 |

OTHER PUBLICATIONS

An RF Chipset for Impulse Radio UWB Using 0.13 μm InP-HEMT Technology. IEEE MTT-Int. Microwave Symp. Dig., pp. 316-319, Jun. 2006.

Taiwanese Office Action & Search Report mailed May 26, 2011 for corresponding Taiwanese Application No. 096145618, with Partial English-language Translation of Search Report.

* cited by examiner

*Primary Examiner* — Chieh M Fan
*Assistant Examiner* — Santiago Garcia
(74) *Attorney, Agent, or Firm* — Fujitsu Patent Center (57) ABSTRACT

A transmitter circuit, which transmits data by using an impulse, has a variable delay circuit and a logic circuit. The variable delay circuit takes a clock as an input, and delays the clock in accordance with the data. The logic circuit takes the clock and an output of the variable delay circuit as inputs, and outputs an impulse by performing a logic operation between the clock and the output of the variable delay circuit.

6 Claims, 13 Drawing Sheets

Fig.11 fc:CENTER FREQUENCY

Fig.12 fc:CENTER FREQUENCY

TRANSMITTER CIRCUIT AND RADIO TRANSMISSION APPARATUS FOR TRANSMITTING DATA VIA RADIO BY USING IMPULSES

CROSS REFERENCE TO RELATED APPLICATION

This application is based upon and claims the benefit of priority from the prior Japanese Patent Application No. 2007-038390, filed on Feb. 19, 2007, the entire contents of which are incorporated herein by reference.

BACKGROUND

The embodiments relate to a transmitter circuit and a radio transmission apparatus and, more particularly to a transmitter circuit and a radio transmission apparatus for transmitting data via radio by using impulses.

Traditionally, radio transmission apparatus for transmitting data via radio by using impulses (impulse-based radio transmission apparatus) have been used in ultra-wideband radio transmission systems including UWB systems in the microwave and submillimeter-wave bands.

In recent years, impulse-based radio transmission has been attracting attention because of the advantages it offers over narrowband communication systems, such as the elimination of the need for oscillators and mixers and the simple configuration of the RF portion, enabling a low-cost implementation, and it is expected to achieve wideband radio transmission exceeding 10 Gbps in the millimeter-wave band where a wide bandwidth can be used.

In the prior art, an article by Y. Kawano et al. entitled "An RF Chipset for Impulse Radio UWB Using 0.3 μm InP-HEMT Technology," IEEE MTT-Int. Microwave Symp. Dig., pp. 316-319, June 2006 (non-patent document 1) discloses an impulse radio transmission apparatus comprising a transmitter part having an impulse generator, a band-pass filter, and a high-output amplifier, and a receiver part having a receiver amplifier (low-noise amplifier), a band-pass filter, and a detector.

SUMMARY OF THE EMBODIMENTS

According to one aspect, there is provided a transmitter circuit transmitting data by using an impulse, including a variable delay circuit taking a clock as an input, and delaying the clock in accordance with the data; and a logic circuit taking the clock and an output of the variable delay circuit as inputs, and outputting an impulse by performing a logic operation between the clock and the output of the variable delay circuit.

According to another aspect, there is provided a radio transmission apparatus having a transmitter circuit transmitting data by using an impulse, a receiver circuit, an antenna, and a transmit-receive switch switching a connection of the antenna to the transmitter circuit or the receiver circuit, wherein the transmitter circuit, comprising a variable delay circuit taking a clock as an input, and delaying the clock in accordance with the data; and a logic circuit taking the clock and an output of the variable delay circuit as inputs, and outputting an impulse by performing a logic operation between the clock and the output of the variable delay circuit.

BRIEF DESCRIPTION OF THE DRAWINGS

The features and advantages of the embodiments will be more clearly understood from the following description with reference to the accompanying drawings, wherein.

DETAILED DESCRIPTION OF THE EMBODIMENTS

Before describing the embodiments in detail, a general configuration of an impulse-based radio transmission apparatus, a prior art radio transmission apparatus and its associated problem will be described with reference to FIGS. 1 to 4.

Figure 1:
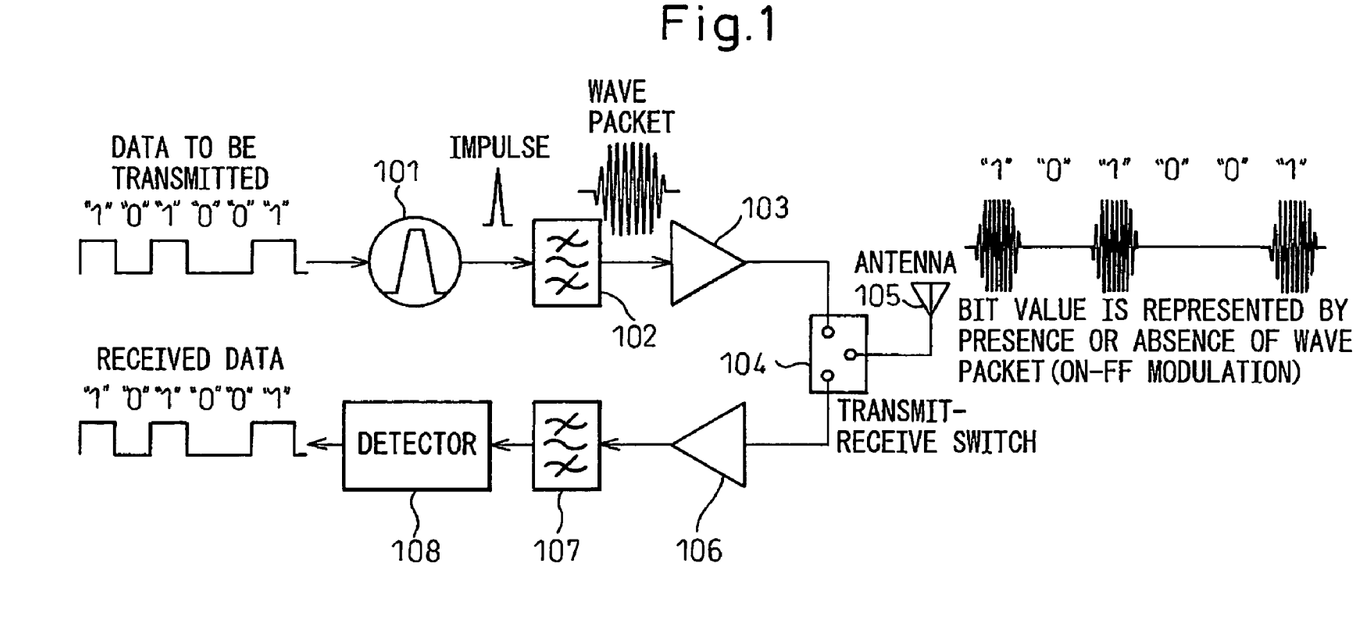
FIG. 1 is a block diagram schematically showing the general configuration of an impulse-based radio transmission apparatus to which the embodiments are to be applied.
Figure 2:
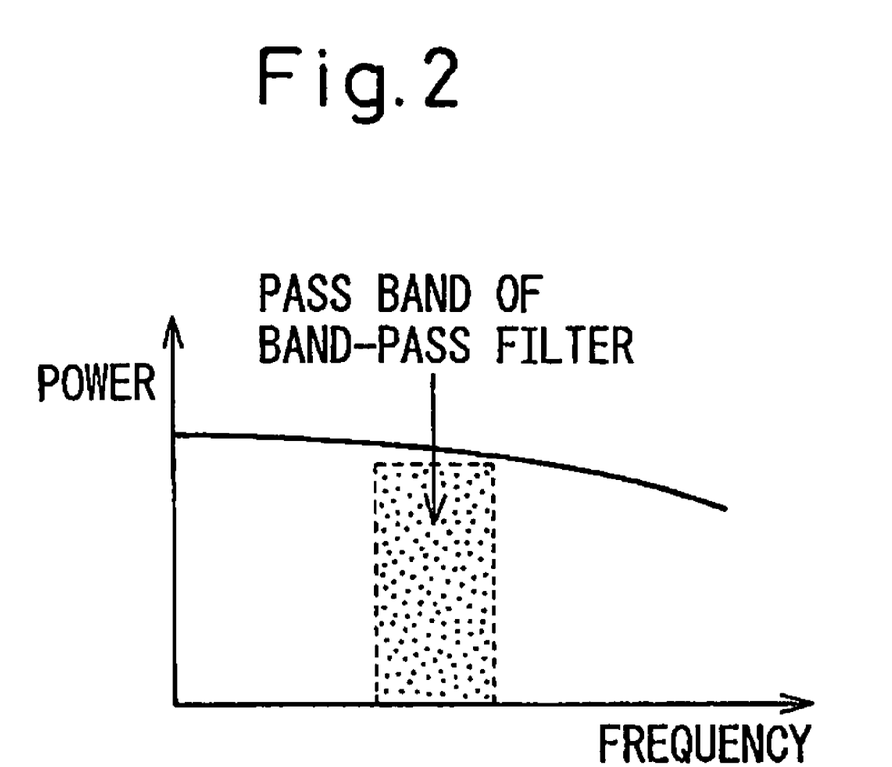
FIG. 2 is a diagram for explaining the function of a band-bass filter used in a transmitter circuit in the radio transmission apparatus shown in FIG. 1.

FIG. 1 is a block diagram schematically showing the general configuration of an impulse-based radio transmission apparatus to which the embodiments are to be applied, and FIG. 2 is a diagram for explaining the function of a band-bass filter used in a transmitter circuit in the radio transmission apparatus shown in FIG. 1. The radio transmission apparatus shown in FIGS. 1 and 2 is a conventional impulse radio transmission apparatus, or more specifically, the impulse radio transmission apparatus shown in the earlier cited non-patent document 1.

As shown in FIG. 1, the transmitter part (transmitter circuit) comprises an impulse generator 101, a band-pass filter 102, and a high-output amplifier 103, and the receiver part (receiver circuit) comprises a receiver amplifier 106, a band-pass filter 107, and a detector 108. Here, an output from the high-output amplifier 103 is fed via a transmit-receive switch 104 to an antenna 105 for transmission, and a signal received by the antenna 105 is fed via the transmit-receive switch 104 to the receiver amplifier 106. The impulse generated by the impulse generator 102 has energy ranging from DC to a high frequency.

As shown in FIG. 2, in the impulse-based transmitter circuit, only energy components that fall within the operating frequency band are extracted by the band-pass filter 102, and the band-pass filter 102 produces an output that is modulated as a wave packet oscillating around the center frequency of the pass band, as shown in FIG. 1. The output (wave packet) of the band-pass filter 102 is amplified by the high-output amplifier 103 and fed via the transmit-receive switch 104 to the antenna 105 for radiation into space.

As shown in FIG. 1, in the simplest impulse system, data is transmitted by on/off modulation which uses the presence/absence of a wave packet to represent one bit, that is, the data is modulated so that the presence of a wave packet containing periodically changing waves, for example, represents a 1 and the absence of a wave packet represents a 0.

On the other hand, in the impulse-based receiver circuit, the signal received by the antenna 105 and input via the transmit-receive switch 104 is amplified by the receiver amplifier 106, after which only the energy components falling within the operating frequency band are extracted by the band-pass filter 107, and the data is demodulated by the detector 108.

In the above-described impulse radio transmission apparatus, if it is desired to achieve large-capacity communication exceeding, for example, 10 Gbps, the time duration of the wave packet must be reduced and, for that purpose, a wide frequency band exceeding 10 GHz must be secured. According to the current radio wave frequency allocations, only millimeter and submillimeter wave bands are available as frequency bands where a wide bandwidth can be secured, and the need therefore arises for an impulse generator that can generate very short impulses of 10 ps or less duration (100 GHz or higher in frequency).

Figure 3:
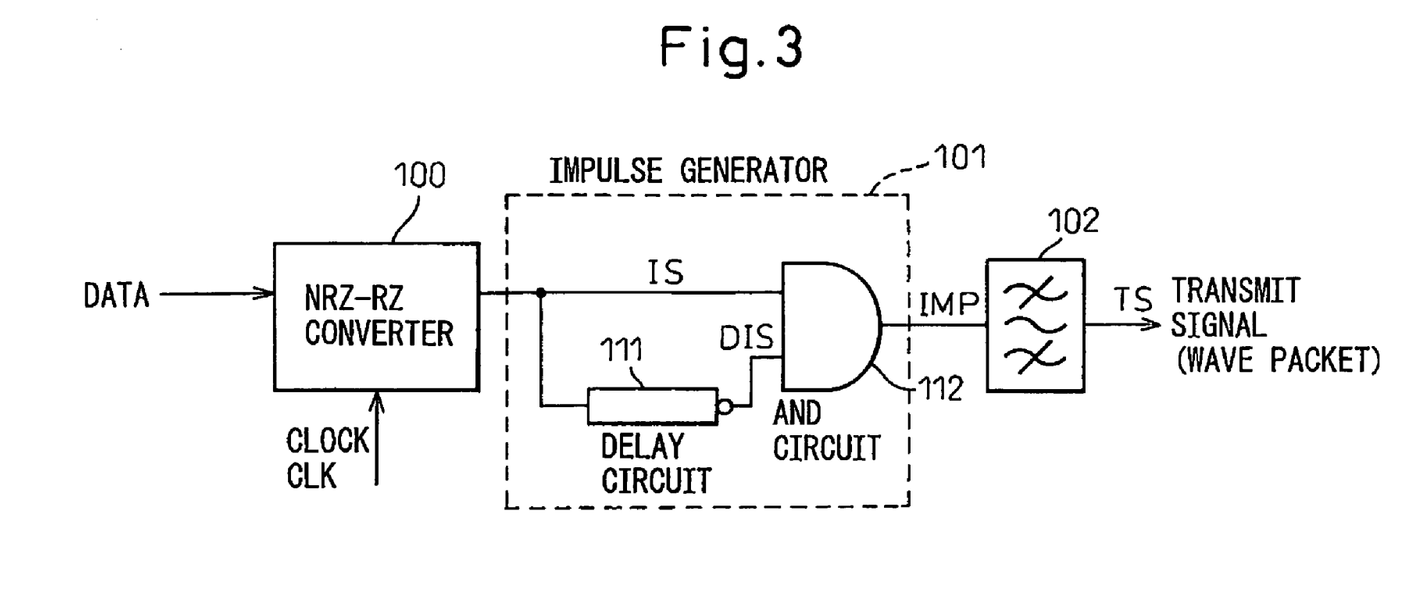
FIG. 3 is a diagram schematically showing one example of a transmitter circuit used in a prior art impulse-based radio transmission apparatus.
Figure 4:
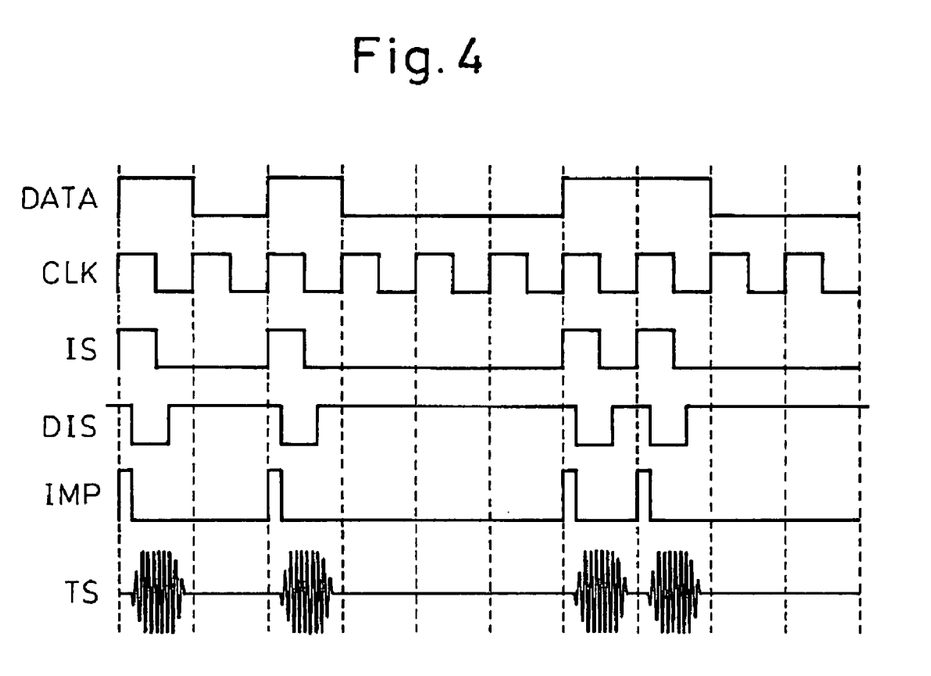
FIG. 4 is a timing diagram for explaining the operation of the transmitter circuit shown in FIG. 3.

FIG. 3 is a diagram schematically showing one example of a transmitter circuit (ON/OFF modulation circuit) used in a prior art impulse-based radio transmission apparatus, and FIG. 4 is a timing diagram for explaining the operation of the transmitter circuit shown in FIG. 3.

As shown in FIG. 3, the prior art transmitter circuit comprises an NRZ-RZ converter 100 which receives data DATA and a clock CLK and converts an RZ (return-to-zero) signal into an NRZ (non-return-to-zero) signal, an impulse generator 101 which receives the output of the NRZ-RZ converter 100 and generates an impulse, and a band-pass filter 102 which receives the output (impulse) of the impulse generator 101, extracts only the energy components falling within the operating frequency band, and outputs a wave packet. As earlier described, the band-pass filter 102 is followed by such components as a high-output amplifier (103) which amplifies the output (transmit signal: wave packet) of the band-pass filter 102.

The impulse generator 101 comprises a delay circuit 111 and an AND circuit 112, and generates a short pulse (impulse) by separating a portion of the input signal, introducing a slight delay into the separated signal by the delay circuit 111, and ANDing the input signal with its delayed version by the AND circuit 112. Here, the output of the delay circuit 111 is applied to the AND circuit 112 after inverting its signal logic.

More specifically, as shown in FIGS. 3 and 4, the AND circuit 112 produces an output signal (impulse) IMP by ANDing the output signal IS of the NRZ-RZ converter 100 with the signal DIS produced by delaying the signal and inverting its logic by means of the delay circuit 111.

Here, it is required that the signal (digital signal) IS to be input to the impulse generator 101 be an RZ signal that always returns to a low level (zero) in one clock cycle, as shown in FIG. 4, in order to ensure that, even when logic is appear in succession, impulses (wave packets) that match the number of successive is are generated.

That is, if the signal IS to be input to the impulse generator 101 is an NRZ signal that does not return to zero in one clock cycle, then if logic is appear in succession, only one impulse (IMP) will occur. For this reason, in the prior art transmitter circuit (ON/OFF modulation circuit), the impulse generator 101 is always preceded by the NRZ-RZ converter 100.

To achieve large-capacity high-speed communications exceeding 10 Gbps for which the demand has been increasing in recent years, as earlier described, the provision of a high-speed low-jitter NRZ-RZ converter (100) and an impulse generator 101 (high-speed AND circuit) for generating impulses of 10 ps or less duration is essential. However, since these circuits are limited purely by device performance, these have impeded the implementation of large-capacity impulse communication in the millimeter and submillimeter wave bands.

An object of the embodiments is to provide a transmitter circuit and radio transmission apparatus that is small in size, provides low power consumption, and is capable of achieving high signal quality.

Below, embodiments of a transmitter circuit and a radio transmission apparatus will be described in detail below with reference to the accompanying drawings.

Figure 5:
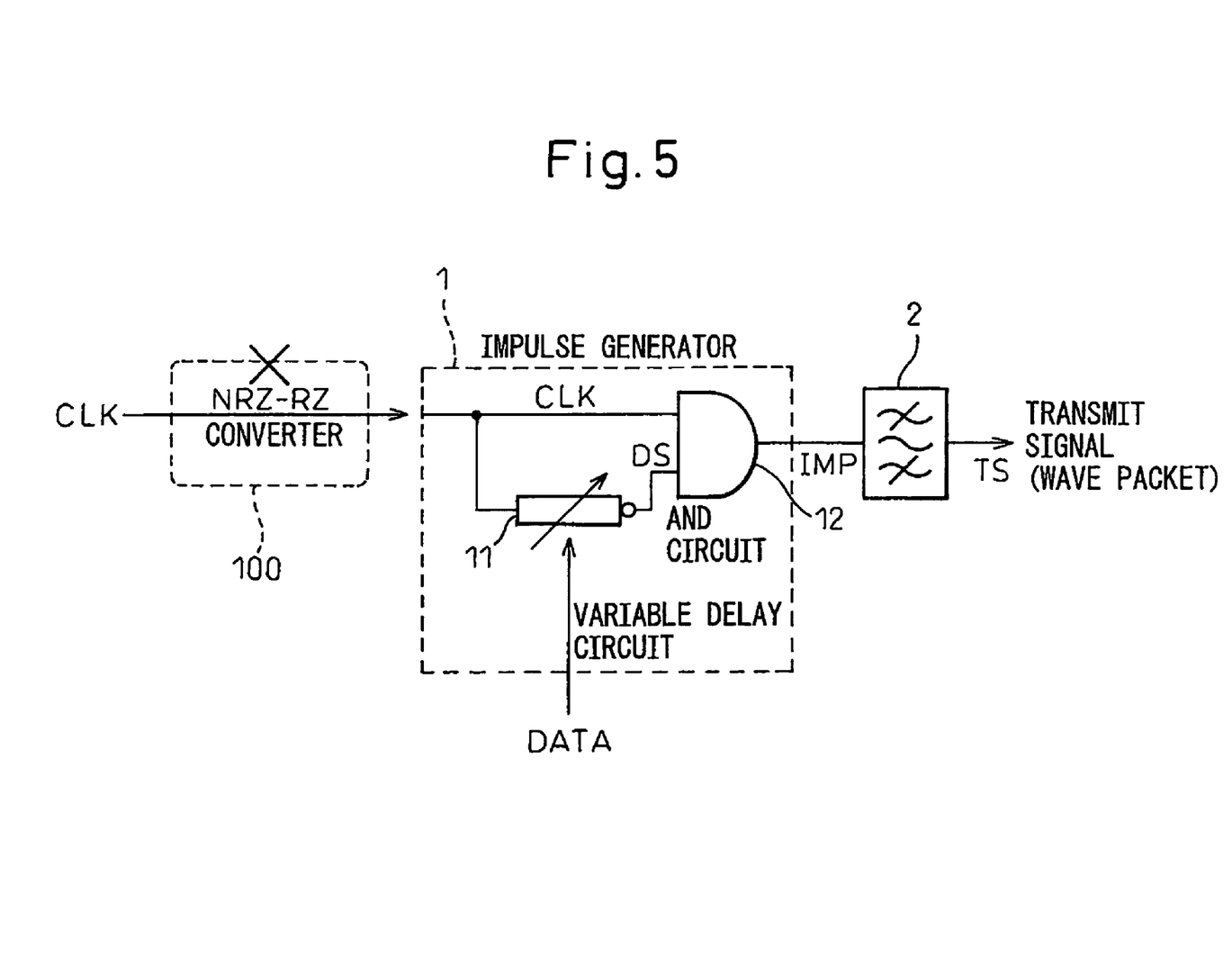
FIG. 5 is a block diagram schematically showing an embodiment of a transmitter circuit used in an impulse-based radio transmission apparatus.
Figure 6:
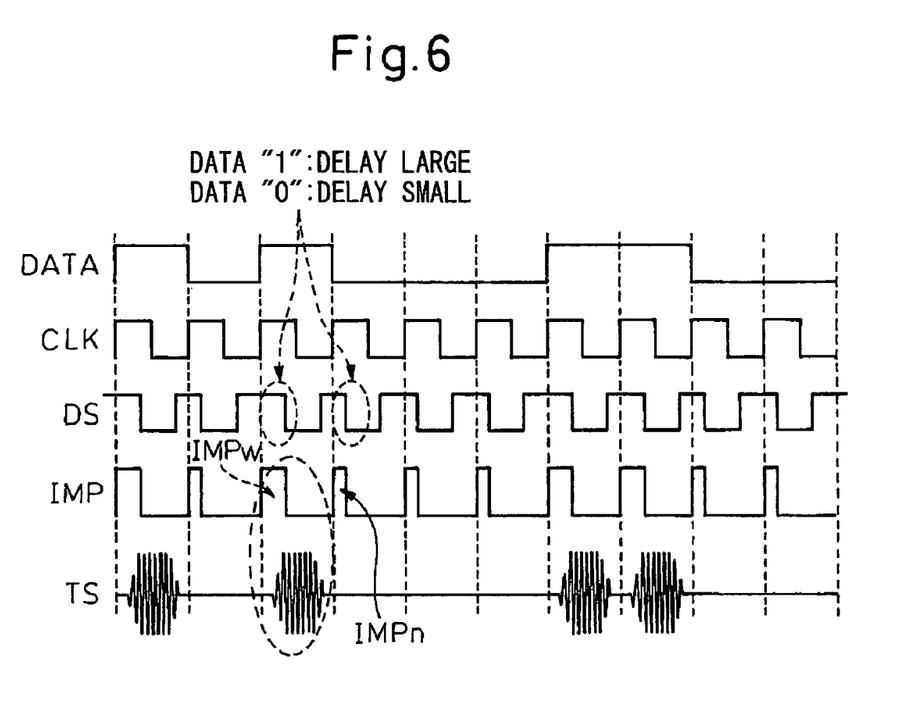
FIG. 6 is a timing diagram for explaining the operation of the transmitter circuit shown in FIG. 5.

FIG. 5 is a block diagram schematically showing an embodiment of the transmitter circuit used in the impulse-based radio transmission apparatus, and FIG. 6 is a timing diagram for explaining the operation of the transmitter circuit shown in FIG. 5.

First, as is apparent from a comparison between FIG. 5 and the previously given FIG. 3, the transmitter circuit of the embodiment eliminates the need for an NRZ-RZ converter (100) which was needed in the prior art transmitter circuit.

More specifically, the transmitter circuit (ON/OFF modulation circuit) of the embodiment comprises an impulse generator 1 having a variable delay circuit 11 and an AND circuit 12, and a band-pass filter 2. The band-pass filter 2 is followed by such components as a high-output amplifier (103) which amplifies the output (wave packet) of the band-pass filter 2.

The variable delay circuit 11 is configured to vary the delay time according to whether data DATA is a 1 or a 0; for example, the delay time is increased when the data is a 1 and reduced when the data is a 0.

Accordingly, as shown in FIG. 6, when the data DATA is a 1, a wide impulse IMPw is generated, and when the data DATA is a 0, a narrow impulse IMPn is generated. Then, as will be described in detail later, ON/OFF modulation is performed by appropriately determining the impulse width according to the operating frequency band and by making provisions to generate a wave packet through the band-pass filter in the case of a wide impulse (IMPw) but not to generate a wave packet in the case of a narrow impulse (IMPn).

The transmitter circuit shown in FIG. 5 can be used, for example, as the transmitter circuit in the radio transmission apparatus described with reference to FIG. 1.

Figure 7:
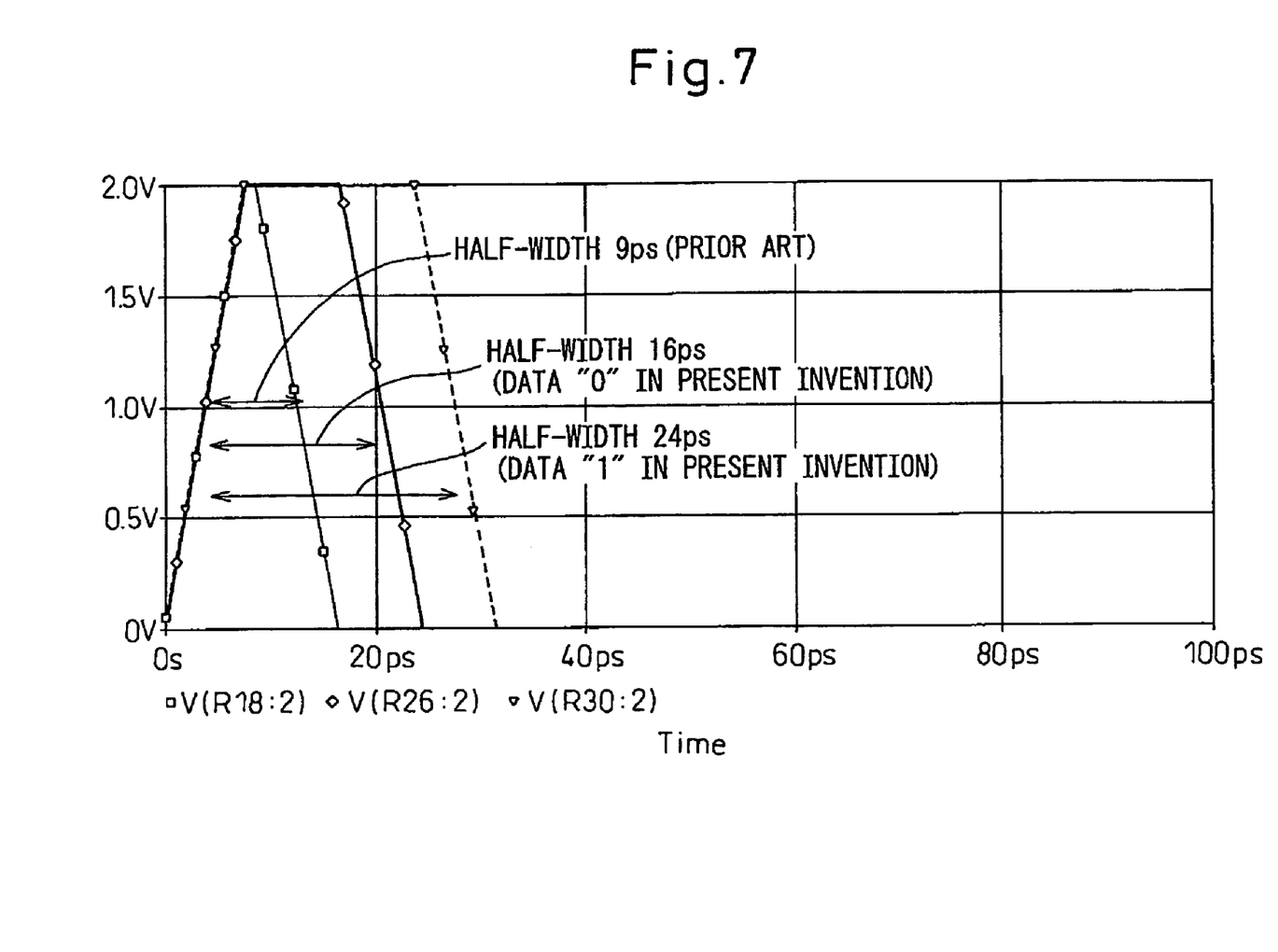
FIG. 7 is a diagram showing examples of the impulses used in the transmitter circuit of the embodiment and the transmitter circuit of the prior art.
Figure 8:
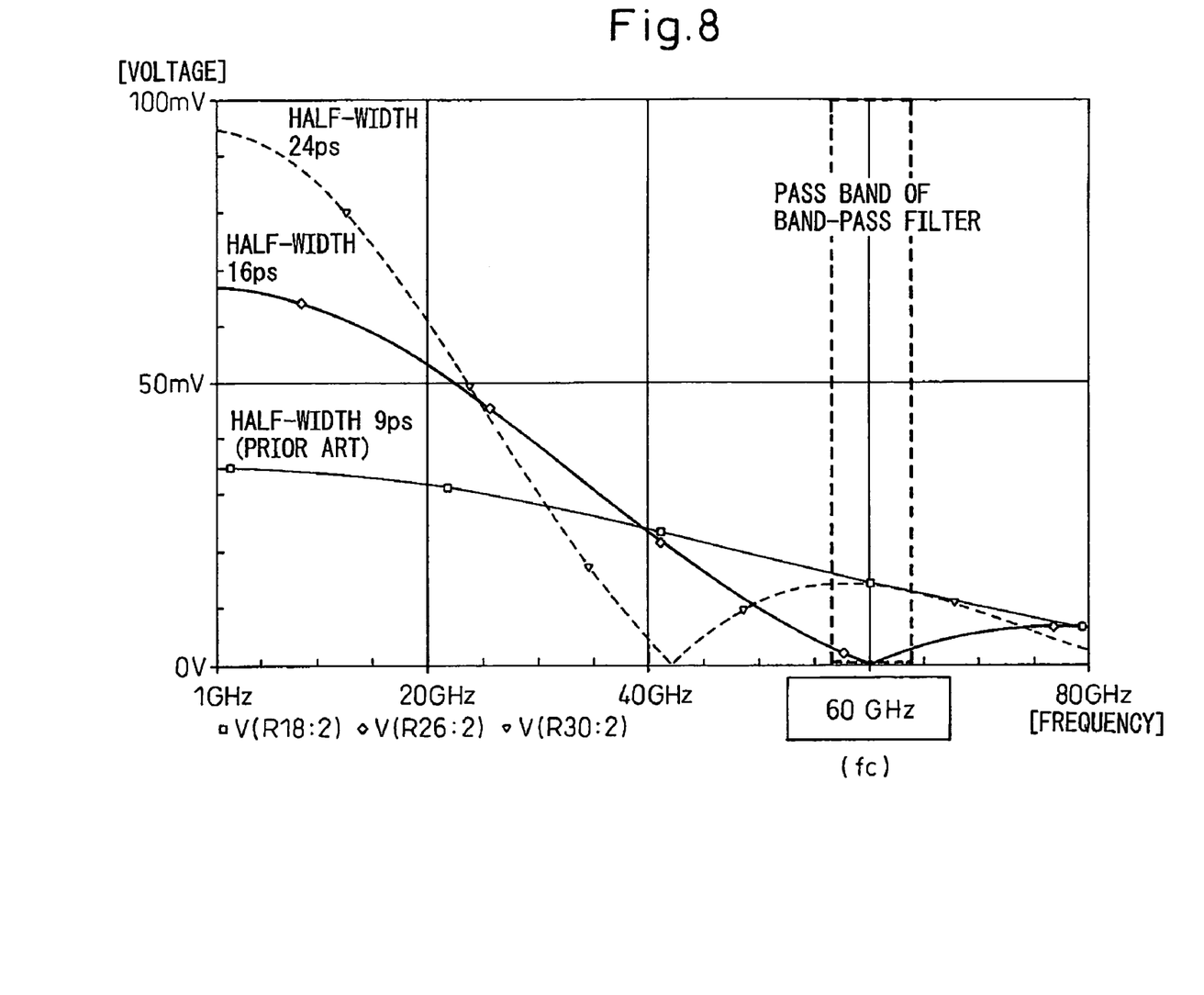
FIG. 8 is a diagram for explaining the operation of a band-pass filter in the transmitter circuit of the embodiment and the transmitter circuit of the prior art.

FIG. 7 is a diagram showing examples of the impulses used in the transmitter circuit of the embodiment and the transmitter circuit of the prior art, and FIG. 8 is a diagram for explaining the operation of the band-pass filter in the transmitter circuit of the embodiment and the transmitter circuit of the prior art.

As shown in FIG. 7, the impulse used in the prior art transmitter circuit described with reference to FIGS. 3 and 4 is, for example, an impulse whose half-width is 9 ps, while the impulse used in the transmitter circuit of the embodiment is, for example, an impulse with a half-width of 16 ps when the data is a 0 and an impulse with a half-width of 24 ps when the data is a 1.

Here, since an actual impulse has a finite rising/falling characteristic, its spectrum is not uniform up to infinitely high frequencies. That is, as shown in FIG. 8, the actual impulse exhibits the characteristic that as the frequency increases, the energy (voltage) once decreases to zero and then increases until reaching a peak after which the energy again decreases to zero.

In this way, the actual impulse comprises a fundamental frequency band, second harmonic frequency band, third harmonic frequency band, and so on, which can be explained by the Fourier transform theory. When the impulse width is denoted by T, the frequency at the boundary between the fundamental and the second harmonic frequency band is given by 1/T, and the peak frequency in the second harmonic frequency band by 3/(2T), while the frequency at the boundary between the second and third harmonic frequency bands is given by 2/T.

Since the prior art transmitter circuit uses the fundamental frequency band, a shorter impulse has had to be generated as the operating frequency band (the pass band of the band-pass filter) becomes higher. That is, denoting the center frequency of the operating frequency band by fc, the impulse width $T_0$ has had to be made sufficiently smaller than 1/fc. Specifically, when the operating frequency band is in the range of 54 GHz to 66 GHz, the prior art transmitter circuit has required the use of an impulse having a half-width of 9 ps.

By contrast, in the transmitter circuit of the embodiment, the impulse (half-width) used in the prior art transmitter circuit can be increased by using a harmonic frequency band.

More specifically, as shown in FIG. 8, when using the second harmonic frequency band, for example, the impulse width is determined so that the peak in the second harmonic frequency band of the impulse coincides with fc (60 GHz). That is, when the impulse width $T_{ON}$=3/(2fc), then an impulse of $T_{on}-T_0 \gg 1/fc$, for example, an impulse with a half-width of 24 ps, can be used.

Next, when the impulse width is determined so that the boundary between the fundamental and the second harmonic frequency band of the impulse coincides with fc, then since very little impulse energy exists at the operating frequency band, the energy of the wave packet output from the band-pass filter becomes extremely small.

More specifically, as shown in FIG. 8, the impulse width such that the boundary between the fundamental and the second harmonic frequency band coincides with fc (60 GHz), for example, is given by $T_{OFF}$=1/fc, and an impulse whose half-width is, for example, 16 ps can be used.

Here, denoting the impulse width for data "0" by $T_{OFF}$, and the impulse width for data "1" by $T_{ON}$, no wave packet appears in the case of the data "0" but a wave packet appears in the case of the data "1", thus accomplishing ON/OFF modulation. That is, for the data "1", an impulse with a half-width of 24 ps can be used by using the second harmonic frequency band, while for the data "0", an impulse with a half-width of 16 ps can be used by using the boundary between the fundamental and the second harmonic frequency band.

Figure 9:
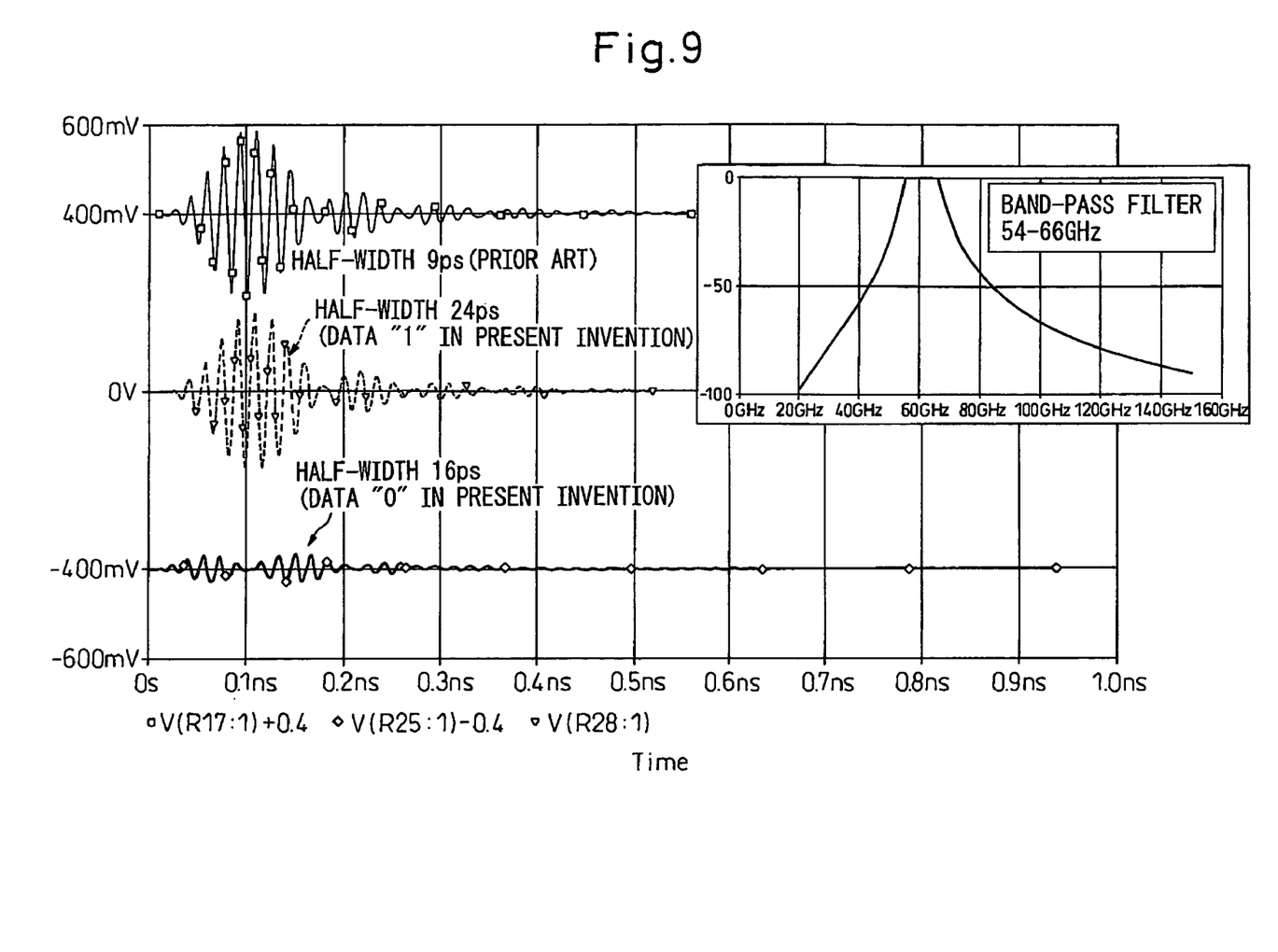
FIG. 9 is a diagram showing examples of band-pass filter outputs in the transmitter circuit of the embodiment and the transmitter circuit of the prior art.

FIG. 9 is a diagram showing examples of the band-pass filter outputs in the transmitter circuit of the embodiment and the transmitter circuit of the prior art; shown here are simulation results when a band-pass filter having a passband of 54 to 66 GHz (the center frequency fc of the operating frequency range is 60 GHz) was used.

As can be seen from FIG. 9, the output of the band-pass filter (102) in the prior art transmitter circuit when an impulse with a half-width of 9 ps is used to represent data "1", for example, is essentially the same as the output of the band-pass filter (2) in the transmitter circuit of the embodiment when an impulse with a half-width of 24 ps is used to represent data "1". It can also be seen that the output of the band-pass filter (2) in the transmitter circuit of the embodiment when an impulse with a half-width of 16 ps is used to represent data "0" is nearly zero, thus providing a clear discrimination between data "1" and data "0".

That is, as shown in FIGS. 7 to 9, when using, for example, the 55 GHz to 65 GHz band, the transmitter circuit of the embodiment uses two kinds of wide impulses, one with a half-width of 24 ps and the other with a half-width of 16 ps, for data "1" and data "0", respectively. In this case, the impulse with a half-width of 24 ps is generated so that the peak in the second harmonic frequency band coincides with the center frequency (fc=60 GHz), while the impulse with a half-width of 16 ps is generated so that the boundary between the fundamental and the second harmonic frequency band coincides with the center frequency fc.

Then, as described with reference to FIG. 9, it can be seen that a signal output (wave packet) comparable to that of the prior art transmitter circuit that uses an impulse with a half-width of 9 ps can be obtained for data "1". Since the half-width of this wave packet is 100 ps, a data transmission of 10 Gbps or higher can be achieved. Further, for data "0", very little output power is obtained, achieving an ON/OFF ratio of 15 dB or higher.

For data "1", instead of using the second harmonic band of the impulse, a higher-order harmonic frequency band such as the third or fourth harmonic band may be used. Likewise, for data "0", instead of using the boundary between the fundamental and the second harmonic frequency band, the boundary between higher-order harmonic bands such as the boundary between the second and third harmonic bands or the boundary between the third and fourth harmonic bands may be used. It will also be appreciated that the correspondence between the presence/absence of a wave packet and the data "1" and "0" may be reversed.

Accordingly, when the data represents the first value (for example, "1"), the delay time in the variable delay circuit 11 can be set equal to an integral multiple, N/fc, of the reciprocal of the center frequency fc (for example, 60 GHz) of the operating frequency band, and when the data represents the second value (for example, "0"), the delay time can be set equal to a value 1/(2fc)+M/fc, i.e., the sum of an integral multiple of the reciprocal of the center frequency fc of the operating frequency band and one half (½) of the reciprocal of the center frequency. Here, N and M are arbitrarily taken independent natural numbers.

In the example previously shown in FIG. 8, when data is "1", an impulse of 16 ps duration determined by taking the reciprocal 1/fc (that is, N=1) of the center frequency fc (=60 GHz) of the operating frequency band is used, and when data is "0", an impulse of 24 ps duration determined by taking the sum 1/(2fc)+1/fc (that is, M=1) of the reciprocal of the center frequency fc (=60 GHz) of the operating frequency band and one half of the reciprocal of the center frequency is used.

In this way, by using the harmonic frequency bands of the impulse, the transmitter circuit according to the embodiment can generate a wave packet without having to substantially reduce the impulse width. Generation of a shorter impulse requires the use of high-speed device technology which is costly, but in the embodiment, since the constraint on the impulse width is relaxed, there is no need to use such high-speed device technology, and the cost of the millimeter/sub-millimeter band impulse communication apparatus (transmitter circuit/radio transmission apparatus) can therefore be reduced.

Furthermore, the elimination of the need for the NRZ-RZ converter the provision of which was a prerequisite in the prior art contributes to not only reducing the cost of the transmitter circuit (radio transmission apparatus) but also reducing the size and power consumption of the apparatus. Further, in the prior art transmitter circuit which takes data as an input signal, signal degradation, in particular, increased jitter, due to the provision of a baseband circuit, etc. becomes a problem, but the transmitter circuit according to the embodiment which takes a clock as an input has the advantage that jitter is small and signal quality improves.

Figure 10:
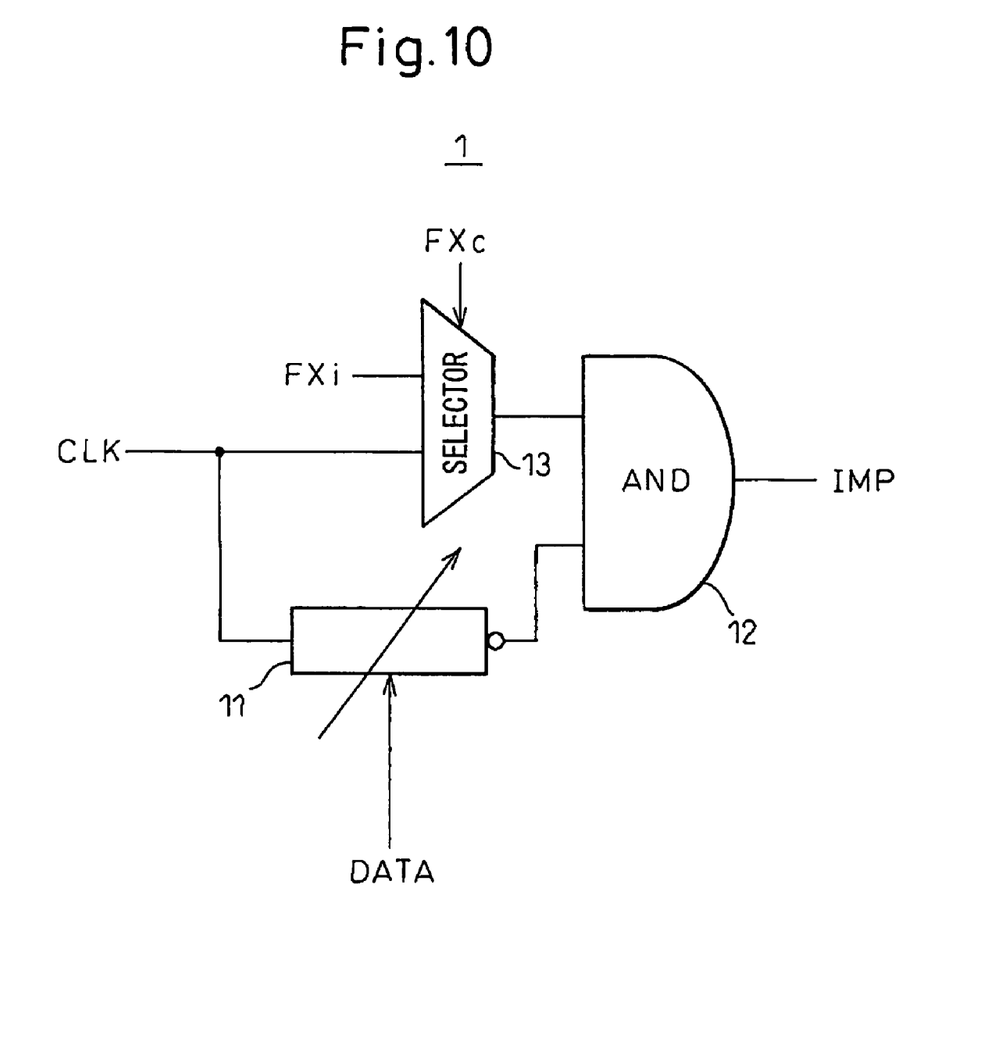
FIG. 10 is a block diagram showing another example of an impulse generator in the transmitter circuit of the embodiment.
Figure 11:
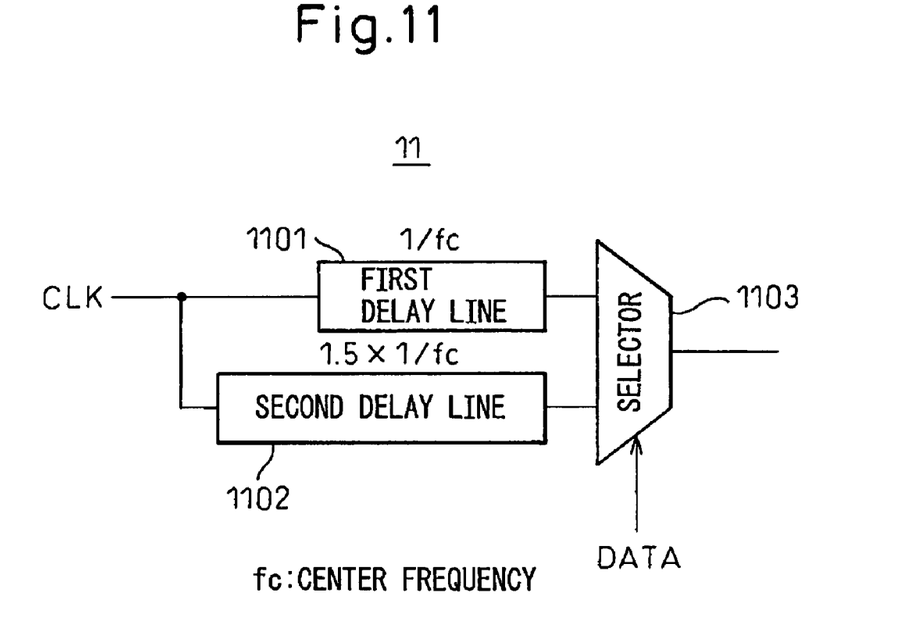
FIG. 11 is a block diagram showing one example of a variable delay circuit in the impulse generator of FIG. 10.
Figure 12:
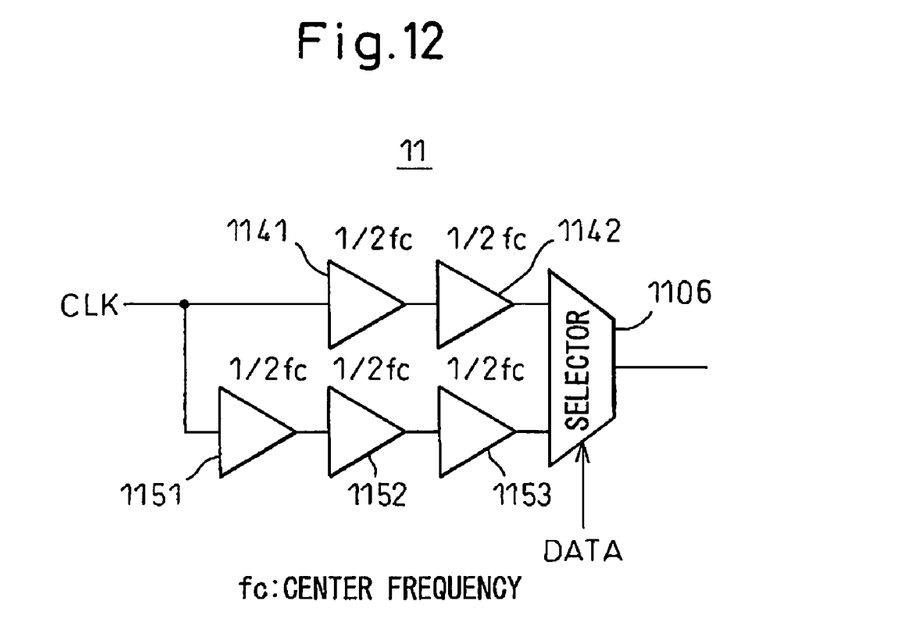
FIG. 12 is a block diagram showing another example of the variable delay circuit in the impulse generator of FIG. 10.

FIG. 10 is a block diagram showing another example of the impulse generator in the transmitter circuit of the embodiment, FIG. 11 is a block diagram showing one example of the variable delay circuit in the impulse generator of FIG. 10, and FIG. 12 is a block diagram showing another example of the variable delay circuit in the impulse generator of FIG. 10. In FIGS. 11 and 12, the signal logic inverting circuitry provided at the output of the variable delay circuit shown in FIG. 10 is not shown.

As shown in FIG. 10, the impulse generator 1 of the embodiment is configured so that the clock CLK is supplied to the AND gate 12 via a selector 13. Here, the variable delay circuit 11 has a circuit configuration such as shown in FIG. 11 or 12. The selector 13 shown in FIG. 10 is identical in configuration to the selector 1103 shown in FIG. 11 or the selector 1106 shown in FIG. 12, and has the function of offsetting (compensating) the delay introduced by the selector 1103 or 1106 provided in the variable delay circuit 11.

Then, the AND circuit 12 ANDs the clock CLK with the time delay produced by a first delay line 1101 or a second delay line 1102 in FIG. 11 or with the time delay produced by an even number of buffers 1141 and 1142 or an odd number of buffers 1151, 1152, and 1153 in FIG. 12.

That is, in the variable delay circuit 11 shown in FIG. 11, one or the other of the two delay lines 1101 and 1102 is selected by the selector 1103 according to whether the data is a 0 or a 1. Here, when forming the delay lines as wiring lines on a GaAs substrate, the first delay line 1101 for data "0" is formed, for example, as a wiring line having a prescribed width and a length of 1.6 mm, and the second delay line 1102 for data "1" is formed, for example, as a wiring line having a prescribed width and a length of 2.4 mm.

On the other hand, in the variable delay circuit 11 shown in FIG. 12, one or the other of the two buffer arrays 1141, 1142 and 1151 to 1153 is selected by the selector 1106 according to whether the data is a 0 or a 1. The buffer amplifiers (buffers) 1141, 1142, and 1151 to 1153 each introduce a delay time of 1/(2fc)=8 ps, and two buffers (1141 and 1142) are connected in series for data "0" and three buffers (1151 to 1153) for data "1". This produces a delay time of 16 ps for data "0" and a delay time of 24 ps for data "1".

Instead of the buffers, inverters may be used by appropriately setting the signal logic. A signal FXi whose level is fixed to a high level or low level is applied to the other input (the input to which the clock CLK is not applied) of the selector 13 provided to compensate the delay introduced by the selector 1103 or 1106 in the variable delay circuit 11, and a fixed-level signal FXc for always selecting the clock CLK for output is applied as the control signal.

It will also be appreciated that various modifications for generating different delay times than those defined above may be made to the configuration shown in FIG. 12, for example, by providing each buffer (or inverter) with a delay time adjusting terminal.

Figure 13:
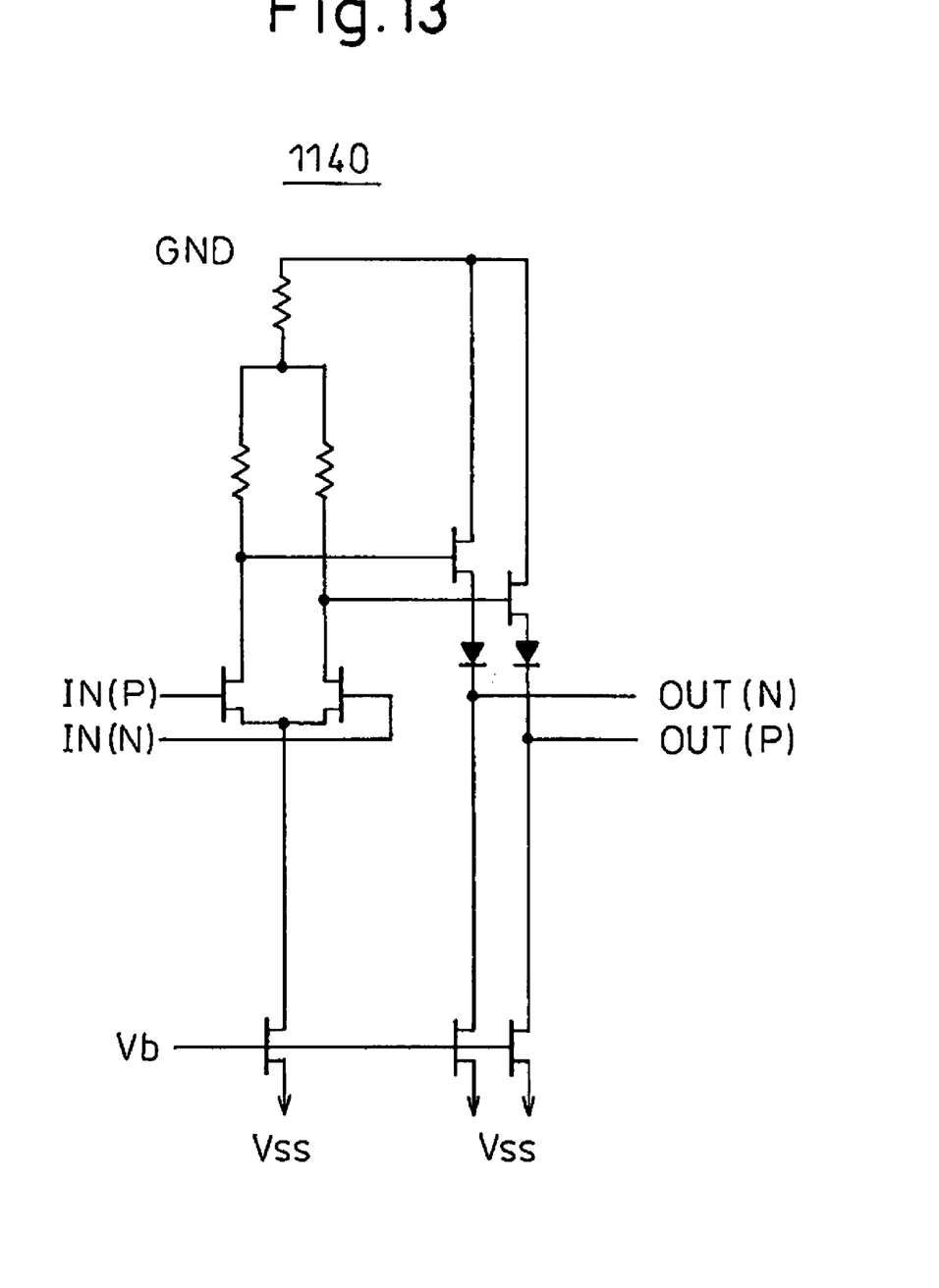
FIG. 13 is a circuit diagram showing one example of a buffer amplifier in the variable delay circuit of FIG. 12.
Figure 14:
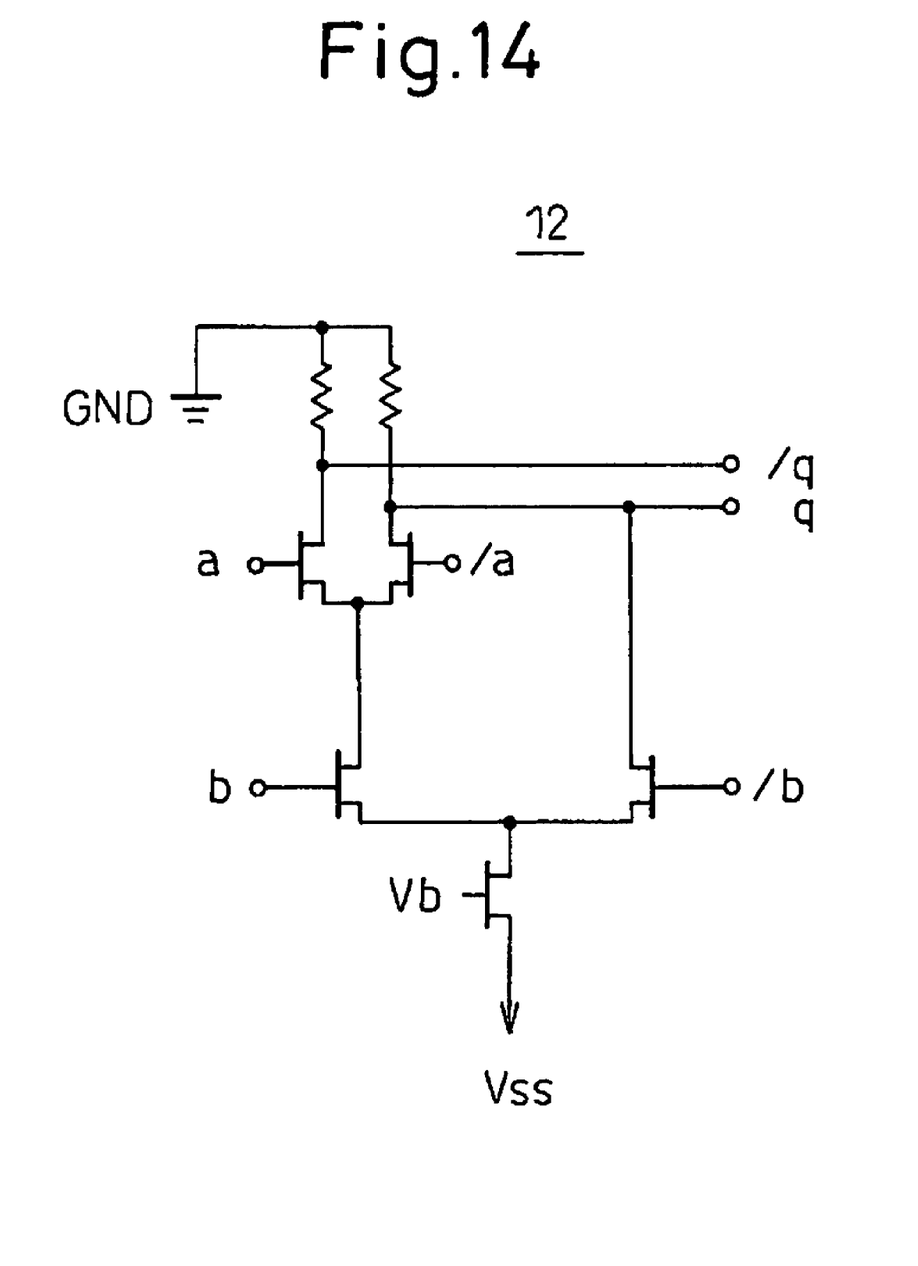
FIG. 14 is a circuit diagram showing one example of an AND circuit in the impulse generator of FIG. 10.

FIG. 13 is a circuit diagram showing one example of each buffer amplifier (buffer) provided in the variable delay circuit of FIG. 12, and FIG. 14 is a circuit diagram showing one example of the AND circuit provided in the impulse generator of FIG. 10. In FIGS. 13 and 14, reference sign Vb designates a prescribed control bias voltage.

As shown in FIG. 13, each of the buffers 1141, 1142, and 1151 to 1153 (1140) can be constructed, for example, as a differential buffer. Here, differential clocks CLK and /CLK are applied as differential inputs IN(P) and IN(N) to each of the first-stage buffers 1141 and 1151, and differential outputs OUT(P) and OUT(N) from each of the buffers 1141, 1151, and 1152 are applied as differential inputs IN(P) and IN(N) to each of the succeeding buffers 1142, 1152, and 1153, respectively; then, differential outputs OUT(P) and OUT(N) from each of the last-stage buffers 1142 and 1153 are applied to the selector 1106.

As shown in FIG. 14, the AND circuit 12 in the impulse generator 1 of FIG. 10 can also be constructed as a differential AND circuit; in this case, the differential outputs of the selector 13 are applied as first differential inputs a and /a to the AND circuit 12, and the inverted versions of the differential outputs of the variable delay circuit 11 (for example, the outputs of the selector 1103 or 1106) are applied as second differential inputs b and /b to the AND circuit 12. The AND circuit 12 produces differential outputs q and /q.

The buffer amplifier shown in FIG. 13 and the AND circuit shown in FIG. 14 are only examples, and not only signal logic or single-ended circuits but various other circuits can also be used.

As described above, according to the embodiments, an impulse-based transmitter circuit and radio transmission apparatus capable of achieving low jitter and high signal quality can be provided without using significantly short impulses, in other words, without having to use high-performance, high-cost devices.

More specifically, according to the embodiments, a transmitter circuit and radio transmission apparatus can be provided that is small in size, provides low power consumption, and is capable of achieving high signal quality.

The embodiments can be applied extensively to transmitter circuits and radio transmission apparatus that transmit data via radio by using impulses, and the transmitter circuit and radio transmission apparatus of the embodiments are particularly advantageous for use in ultra-wideband radio transmission systems including UWB systems in the microwave and submillimeter-wave bands.

Many different embodiments may be constructed without departing from the scope of the present invention, and it should be understood that the present invention is not limited to the specific embodiments described in this specification, except as defined in the appended claims.

What is claimed is:

1. A transmitter circuit transmitting data by using an impulse, comprising:
   a variable delay circuit taking a clock as an input, and delaying said clock in accordance with said data; and
   a logic circuit taking said clock and an output of said variable delay circuit as inputs, and outputting an impulse by performing a logic operation between said clock and the output of said variable delay circuit, wherein
   a delay time to be introduced by said variable delay circuit is determined according to whether said data represents a first value or a second value,
   when said data represents the first value, no signal is output, but when said data represents the second value, a signal is output, when said data represents the first value, said delay time in said variable delay circuit is set equal to an integral multiple [N/fc] of the reciprocal of a center frequency [fc] of an operating frequency band, and when said data represents the second value, said delay time is set equal to a value [1/(2fc)+M/fc] which represents a sum between an integral multiple of the center frequency [fc] of said operating frequency band and the reciprocal of one half of said center frequency (where N and M are arbitrarily taken independent natural numbers).

2. A transmitter circuit transmitting data by using an impulse, comprising:

a variable delay circuit taking a clock as an input, and delaying said clock in accordance with said data; and a logic circuit taking said clock and an output of said variable delay circuit as inputs, and outputting an impulse by performing a logic operation between said clock and the output of said variable delay circuit, wherein said variable delay circuit comprises a first delay line constructed by cascading an even number of unit lines and used when said data represents a first value, a second delay line constructed by cascading an odd number of unit lines and used when said data represents a second value, each of said unit lines being a transmission line that introduces a delay time [1/(2fc)] equal to one half of the reciprocal of a center frequency of an operating frequency band, and a selector for selecting an output of one or the other of said first and second delay lines.

3. A transmitter circuit transmitting data by using an impulse, comprising:

a variable delay circuit taking a clock as an input, and delaying said clock in accordance with said data; and a logic circuit taking said clock and an output of said variable delay circuit as inputs, and outputting an impulse by performing a logic operation between said clock and the output of said variable delay circuit, wherein said variable delay circuit comprises a first buffer array constructed by connecting an even number of buffers in series and used when said data represents a first value, a second buffer array constructed by connecting an odd number of buffers and used when said data represents a second value, each of said buffers being a unit buffer that introduces a delay time [1/(2fc)] equal to one half of the reciprocal of a center frequency of an operating frequency band, and a selector for selecting an output of one or the other of said first and second buffer arrays.

4. A transmitter circuit transmitting data by using an impulse, comprising:

a variable delay circuit taking a clock as an input, and delaying said clock in accordance with said data; and a logic circuit taking said clock and an output of said variable delay circuit as inputs, and outputting an impulse by performing a logic operation between said clock and the output of said variable delay circuit, wherein said variable delay circuit comprises a first inverter array constructed by connecting an even number of inverters in series and used when said data represents a first value, a second inverter array constructed by connecting an odd number of inverters and used when said data represents a second value, each of said inverters being a unit inverter that introduces a delay time [1/(2fc)] equal to one half of the reciprocal of a center frequency of an operating frequency band, and a selector for selecting an output of one or the other of said first and second inverter arrays.

5. A radio transmission apparatus having a transmitter circuit transmitting data by using an impulse, a receiver circuit, an antenna, and a transmit-receive switch switching a connection of said antenna to said transmitter circuit or said receiver circuit, wherein said transmitter circuit, comprising:

an impulse generator including:

a variable delay circuit taking a clock as an input, and delaying said clock in accordance with said data; and a logic circuit taking said clock and an output of said variable delay circuit as inputs, and outputting an impulse by performing a logic operation between said clock and the output of said variable delay circuit; and a band-pass filter permitting components of said impulse and outputting as a wave packet, said impulse being output from said impulse generator that fall within a prescribed band to pass through, wherein a delay time to be introduced by said variable delay circuit is determined according to whether said data represents a first value or a second value different from said first value, and when said data represents the first value, a wave packet is output by determining an impulse width to a first width, and when said data represents the second value, no wave packet is output by determining an impulse width to a second width which is smaller than said first width.

6. The radio transmission apparatus as claimed in claim 5, wherein said receiver circuit comprises a receiver amplifier to which a signal received by said antenna is input via said transmit-receive switch, a second band-pass filter extracting a signal falling within a prescribed band from an output of said receiver amplifier, and a detector detecting an output of said band-pass filter and thereby generates data.

* * * * *